United States Patent
Tonkovich et al.

(10) Patent No.: US 7,288,231 B2
(45) Date of Patent: *Oct. 30, 2007

(54) CHEMICAL REACTOR AND METHOD FOR GAS PHASE REACTANT CATALYTIC REACTIONS

(75) Inventors: Anna Lee Y. Tonkovich, Marysville, OH (US); Yong Wang, Richland, WA (US); Sean P. Fitzgerald, Hilliard, OH (US); Jennifer L. Marco, South Charleston, OH (US); Gary L. Roberts, West Richland, WA (US); David P. VanderWiel, Hilliard, OH (US); Robert S. Wegeng, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 568 days.

This patent is subject to a terminal disclaimer.

(21) Appl. No.: 10/717,608

(22) Filed: Nov. 21, 2003

(65) Prior Publication Data
US 2004/0105812 A1 Jun. 3, 2004

Related U.S. Application Data

(60) Division of application No. 09/640,903, filed on Aug. 16, 2000, now Pat. No. 6,680,044, which is a continuation-in-part of application No. 09/375,614, filed on Aug. 17, 1999, now Pat. No. 6,488,838.

(51) Int. Cl.
*B01J 8/04* (2006.01)
*B01D 50/00* (2006.01)

(52) U.S. Cl. ............... 422/177; 422/173; 422/190; 422/211; 422/222

(58) Field of Classification Search ............... 422/177, 422/173, 190, 211, 222
See application file for complete search history.

(56) References Cited

U.S. PATENT DOCUMENTS

| | | | |
|---|---|---|---|
| 4,472,533 A | 9/1984 | Moskovits | |
| 4,597,947 A | 7/1986 | Almaula | |
| 4,795,618 A | 1/1989 | Laumen | |
| 4,985,230 A | 1/1991 | Baden et al. | |
| 5,366,719 A | 11/1994 | van Wingerden et al. | |
| 5,432,023 A | 7/1995 | Yamada et al. | |
| 5,440,872 A | 8/1995 | Pfefferle | |
| 5,674,301 A * | 10/1997 | Sakai et al. | 48/61 |
| 5,811,062 A | 9/1998 | Wegeng et al. | |
| 6,036,927 A | 3/2000 | Chatterjee et al. | |
| 6,040,266 A | 3/2000 | Fay, III et al. | |
| 6,143,943 A | 11/2000 | Oroskar et al. | |
| 6,200,536 B1 | 3/2001 | Tonkovich et al. | |

(Continued)

FOREIGN PATENT DOCUMENTS

DE 19654361 A1 6/1998

(Continued)

*Primary Examiner*—N. Bhat
(74) *Attorney, Agent, or Firm*—Derek Maughan; Frank Rosenberg

(57) ABSTRACT

The present invention provides chemical reactors and reaction chambers and methods for conducting catalytic chemical reactions having gas phase reactants. In preferred embodiments, these reaction chambers and methods include at least one porous catalyst material that has pore sizes large enough to permit molecular diffusion within the porous catalyst material.

26 Claims, 10 Drawing Sheets

U.S. PATENT DOCUMENTS

| | | | |
|---|---|---|---|
| 6,217,732 | B1 | 4/2001 | Schuh et al. |
| 6,265,451 | B1 | 7/2001 | Zhou et al. |
| 6,451,864 | B1 * | 9/2002 | Wang et al. ............... 518/715 |
| 6,488,838 | B1 * | 12/2002 | Tonkovich et al. ......... 208/108 |
| 6,490,812 | B1 | 12/2002 | Bennett et al. |
| 6,534,022 | B1 | 3/2003 | Carlborg et al. |
| 6,540,975 | B2 | 4/2003 | Tonkovich et al. |
| 6,558,634 | B1 | 5/2003 | Wang et al. |
| 6,652,830 | B2 | 11/2003 | Wang et al. |
| 6,660,237 | B2 * | 12/2003 | Wang et al. ............... 422/222 |
| 6,680,044 | B1 | 1/2004 | Tonkovich et al. |
| 6,749,814 | B1 * | 6/2004 | Bergh et al. ............... 422/130 |
| 6,932,951 | B1 * | 8/2005 | Losey et al. ............... 422/211 |
| 6,969,505 | B2 * | 11/2005 | Tonkovich et al. ......... 423/648.1 |
| 6,984,363 | B2 * | 1/2006 | Tonkovich et al. ......... 422/173 |
| 7,045,114 | B2 * | 5/2006 | Tonkovich et al. ......... 423/659 |
| 2001/0026782 | A1 | 10/2001 | Wang et al. |
| 2003/0103878 | A1 | 6/2003 | Morse et al. |
| 2004/0013606 | A1 | 1/2004 | Tonkovich et al. |
| 2004/0105812 | A1 | 6/2004 | Tonkovich et al. |
| 2004/0188326 | A1 | 9/2004 | Tonkovich et al. |
| 2004/0228781 | A1 | 11/2004 | Tonkovich et al. |

FOREIGN PATENT DOCUMENTS

EP    0861802 A2    9/1998

* cited by examiner

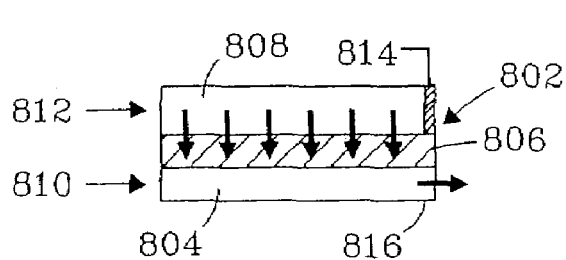
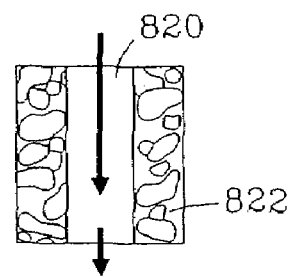
Fig. 1a  Fig. 1b
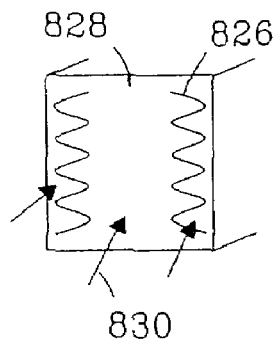
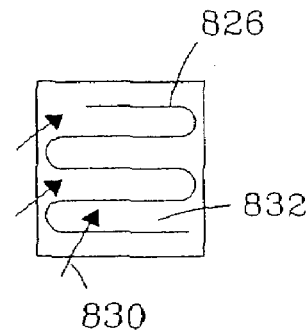
Fig. 1c  Fig. 1d
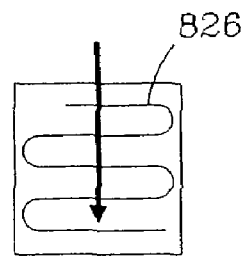
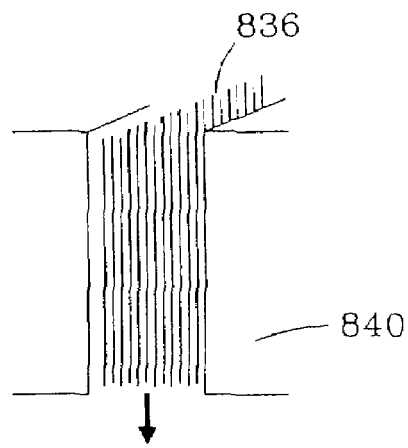
Fig. 1e  Fig. 1f

CHEMICAL REACTOR AND METHOD FOR GAS PHASE REACTANT CATALYTIC REACTIONS

RELATED APPLICATIONS

This application is a divisional of U.S. patent application Ser. No. 09/640,903, filed Aug. 16, 2000, now U.S. Pat. No. 6,680,044, which was a Continuation-In-Part of U.S. patent application Ser. No. 09/375,614, filed Aug. 17, 1999, now U.S. Pat. No. 6,488,838, both of which are incorporated herein in full, as if reproduced below.

FIELD OF THE INVENTION

The present invention is a chemical reactor and method for gas phase reactant catalytic reactions.

As used herein, the term "molecular diffusion" is used in its classic sense of the transfer of mass based upon Brownian motion between adjacent layers of fluid in laminar, transition, or turbulent flow, and includes transfer of mass between adjacent layers of fluid that are stagnant.

As used herein, the term "Knudsen diffusion" means Knudsen flow, or free molecule flow, wherein the mean free path of the molecules is long compared to a characteristic dimension of the flow field, for example the pore size of a material through which the molecules are diffusing. In Knudsen diffusion, molecules typically collide with walls rather than with other gas phase molecules.

BACKGROUND OF THE INVENTION

Many catalytic reactions begin with gas phase reactants, for example steam reforming, partial oxidation, water gas shift and others. However, equipment, specifically reactor volume is generally large because of mass and heat transfer limitations. Conventional reactors are operated with a gas hourly space velocity from about 1,000 to about 3600 $hr^{-1}$. In other words, contact time is greater than 1 second because of the heat and mass transfer limitations.

These problems have been recognized and research is considering microchannel reactors because the microchannels have been shown to offer less resistance to heat and mass transfer thus creating the opportunity for dramatic reductions in process hardware volume. Several types of microchannel reactors have been described in the literature.

Franz et al., 1998 and Lowe et al., 1998 report applying a coating of the active catalyst (such as Pt, Ag, or other noble metal) directly to the microchannel wall. This approach has the disadvantage that the only usable surface area is that of the microchannel wall.

Weissmeier and Honicke, 1998a-b report creating a porous interface directly from the microchannel wall material onto which the catalyst is deposited. An aluminum wall was anodized to create the porous alumina interface that had an average pore diameter in the nanometer size range (permitting only Knudsen diffusion) and a thickness in the range of tens of microns. Disadvantages of this approach include that it is only applicable for aluminum, and limited surface area. The anodized walls formed a two-dimensional array of 700 identical microchannels.

Tonkovich/Zilka et al., 1998 reported packing catalytic powders directly within an array of parallel microchannels as a packed microbed. A disadvantage was a tendency to create relatively large pressure drops by forcing the fluid to flow through the packed microbed.

Tonkovich/Jimenez et al., 1998 reported placing a palladium catalyst supported on a metallic nickel foam within a cavity (more than an order of magnitude larger than a microchannel) and then sending the effluent to an array of microchannels to exchange heat. Again, a disadvantage was large pressure drop through the metal foam.

Hence, there is a need for a chemical reactor for catalytic reactions with fast kinetics that has a small reactor volume with a low pressure drop.

BACKGROUND REFERENCES

Franz, A. J., Quiram, D., Srinivasan, R., Hsing, I-M., Firebaugh, S. L., Jensen, K. F., and M. A. Schmidt, 1998, New Operating Regimes and Applications Feasible with Microreactors, Proceedings of the Second International Conference on Microreaction Technology, New Orleans, La., p 33-38.

Lowe, H., Ehrfeld, W., Gebauer, K., Golbig, K., Hausner, O., Haverkamp, V., Hessel, V., and Richter, Th., 1998, Microreactor Concepts for Heterogeneous Gas Phase Reactions, Proceedings of the Second International Conference of Microreaction Technology, March 1998, New Orleans, La., p. 63-74.

Tonkovich, A. Y., Zilka, J. L., Powell, M. R., and C. J. Call, 1998, The Catalytic Partial Oxidation of Methane in a Microchannel Chemical Reactor, Proceedings of the Second International Conference of Microreaction Technology, March 1998, New Orleans, La., p. 45-53.

Tonkovich, A. Y., Jimenez, D. M., Zilka, J. L., LaMont, M., Wang, Y., and R. S. Wegeng, 1998, Microchannel Chemical Reactors for Fuel Processing, Proceedings of the Second International Conference of Microreaction Technology, March 1998, New Orleans, La., p. 186-195.

Weissmeier, G., and Honicke, D., 1998a, Strategy for the Development of Micro Channel Reactors for Heterogeneously Catalyzed Reactions, Proceedings of the Second International Conference on Microreaction Technology, New Orleans, La., p. 24-32.

Weissmeier, G., and Honicke, D., 1998b, Microreaction Technology: Development of a microchannel reactor and its application in heterogeneously catalyzed hydrogenation, Proceedings of the Second International Conference on Microreaction Technology, New Orleans, La., p. 152-153.

SUMMARY OF THE INVENTION

The present invention provides a chemical reactor including: at least one reaction chamber comprising at least one porous catalyst material and at least one open area wherein each of said at least one reaction chamber has an internal volume defined by reaction chamber walls. The internal volume has dimensions of chamber height, chamber width and chamber length. The at least one reaction chamber comprises a chamber height or chamber width that is about 2 mm or less. At a point where the chamber height or the chamber width is about 2 mm or less, the chamber height and the chamber width define a cross-sectional area. The cross-sectional area comprises a porous catalyst material and an open area, where the porous catalyst material occupies 5% to 95% of the cross-sectional area and where the open area occupies 5% to 95% of the cross-sectional area. The open area in the cross-sectional area occupies a contiguous area of $5 \times 10^{-8}$ to $1 \times 10^{-2}$ $m^2$ and the porous catalyst material has a pore volume of 5 to 98% and more than 20% of the pore volume comprises pores having sizes of from 0.1 to 300 microns.

In another aspect, the invention provides a chemical reactor including at least one reaction chamber in which there are catalyst rods, plates or baffles having a length to thickness ratio of at least 10, and wherein the at least one reaction chamber has an internal volume defined by reaction chamber walls. The internal volume has dimensions of chamber height, chamber width and chamber length; and the at least one reaction chamber comprises a chamber height or chamber width that is 2 mm or less. The catalyst rods, plates or baffles are disposed in said reaction chamber such that the pressure drop across the reaction chamber is less than 20% of the total system inlet pressure.

In another aspect, the invention provides a chemical reactor including at least three layers. A first layer comprising a first porous catalyst material; a second layer comprising a heat exchanger and at least one fluid flow path through the second layer. The second layer is disposed in the reaction chamber such that fluid passing through the first porous catalyst material can pass through the at least one fluid flow path, and a third layer comprising a second porous catalyst material where the third layer is disposed in the reaction chamber such that fluid passing through the second layer can pass into the second porous catalyst material. The first layer includes continuous channels having dimensions of channel height, channel width and channel length. The continuous channels have a channel height and/or channel width of 0.1 micrometer to 2 mm or less. The first porous catalyst material has a pore volume of 5 to 98% and more than 20% of the pore volume comprises pores having sizes of from 0.1 to 300 microns.

The invention also includes a method of hydrocarbon steam reforming. In this method, a reactant stream comprising steam and hydrocarbon is passed into at least one reaction chamber. The reaction chamber has an internal volume having dimensions of chamber height, chamber width and chamber length. The chamber height or chamber width is 2 mm or less. Each reaction chamber has a beginning and an end. The chamber length is the distance from the beginning to the end of the reaction chamber. The reactant stream entering the beginning of the reaction chamber is converted to a product stream that exits the reaction chamber. This product stream includes hydrogen, carbon dioxide and/or carbon monoxide; wherein at least 70% of said equilibrium conversion of the hydrocarbon entering the beginning of said at least one reaction chamber is converted to hydrogen, carbon monoxide and/or carbon dioxide. The process is conducted under conditions such that the hydrocarbon has a contact time of less than 300 milliseconds.

The invention further provides a method of conducting a chemical reaction in a chemical reactor. In this method, gaseous reactant is passed into a first compartment. The chemical reactor includes a porous catalyst material, a first compartment and a second compartment. The first compartment and the second compartment include open spaces that permit bulk flow of a gas. The first compartment has an internal volume having dimensions of compartment height, compartment width and compartment length. The compartment height or width is about 2 mm or less. The porous catalyst material is disposed between the first compartment and the second compartment. The gaseous reactant reacts within the porous catalyst material.

In another aspect, the invention provides a method of conducting a chemical reaction in a chemical reactor in which a gaseous reactant is passed into a first compartment. The reaction chamber comprises a first compartment and a second compartment, and a partition disposed between the first compartment and the second compartment. The partition comprises a fluid distribution layer or a separating agent. The first compartment has an internal volume having dimensions of compartment height, compartment width and compartment length. The first compartment includes a porous catalyst material and at least one open space that permits bulk flow of a gas and has a compartment height or compartment width that is about 2 mm or less. In this method a gas travels through the partition. In preferred embodiments, the partition includes a flow distribution layer and a gaseous reactant convectively travels through the flow distribution layer from the second to the first compartment; and after traveling through the flow distribution sheet, reacts in a porous catalyst material contained within the first compartment. In another embodiment, the partition comprises a membrane or a sorbent which may selectively separate a product formed in the first compartment or selectively separate a reactant such as oxygen from air for use in a distributed feed application.

The invention also includes a method of conducting a chemical reaction in which a gaseous reactant is passed into a bulk flow path of at least one reaction chamber. The bulk flow path is contiguous throughout said chamber length. The reaction chamber has an internal volume having dimensions of chamber height, chamber width and chamber length. The at least one reaction chamber comprises a chamber height or chamber width that is about 2 mm or less. A porous catalyst material is disposed within said internal volume, the porous catalyst material having a porous internal structure such that the gaseous reactant can diffuse molecularly within the material. The gaseous reactant reacts in the porous catalyst material to form at least one product.

While various aspects of the present invention are described and claimed in terms of one or two reaction chambers, it should be recognized that the invention is envisioned to operate most effectively where reactors contain multiple reaction chambers, and therefore the invention should not be limited to reactors and methods having only one reaction chamber. In many embodiments a characteristic dimension of about 2 mm or less is selected because mass transport and heat transport on this scale can be highly efficient.

It should be recognized that many of the embodiments and reaction chamber designs described herein are well-suited for combinations amongst the various designs. For example, the reaction chambers illustrated in FIGS. 10d and 10e could be integrated with a conduit for carrying fluids from one layer to another (such as a conduit from a second catalyst layer back to the first catalyst layer). Therefore the invention should be understood as including combinations of the various designs and embodiments described herein.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
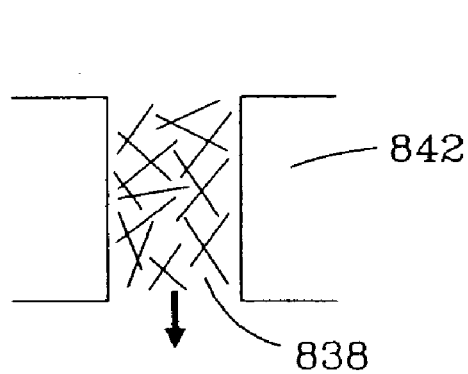
FIG. 1 illustrates cross-sectional schematic views of reaction chamber configurations including (a) compartments with an intervening porous catalyst material; (b) a bulk flow channel disposed between porous catalyst layers; (c) dual corrugated catalyst; (d) corrugated catalyst with gas flow over the catalyst surface; (e) corrugated catalyst with gas flow through the catalyst; (f) wires of catalyst material; (g) fibers; (h) baffles having coatings of porous catalyst material; (i) baffles composed of porous catalyst material; j) a porous matrix with bulk flow channels; and (k) a flow distribution sheet that distributes flow into a catalyst-containing compartment.
Figure 1:
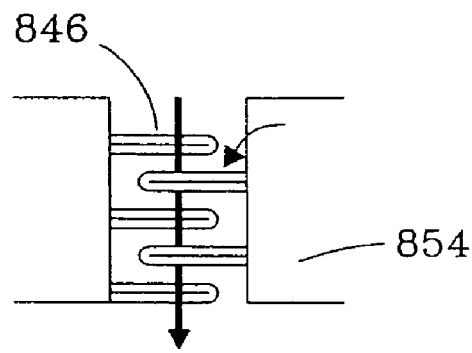
Figure 1:
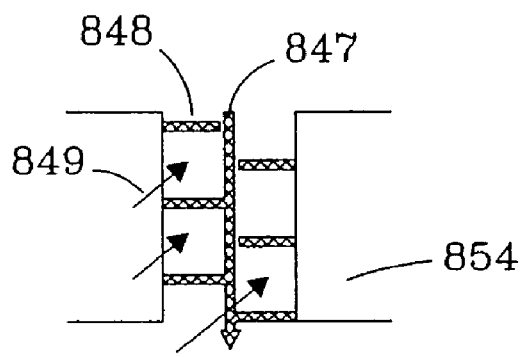
Figure 1:
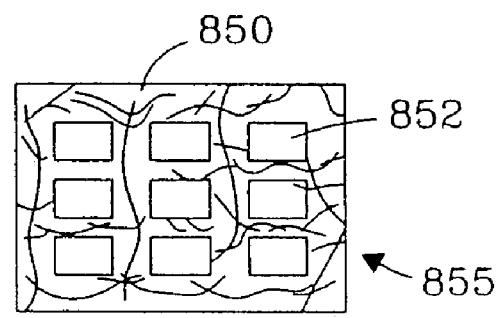
Figure 1:
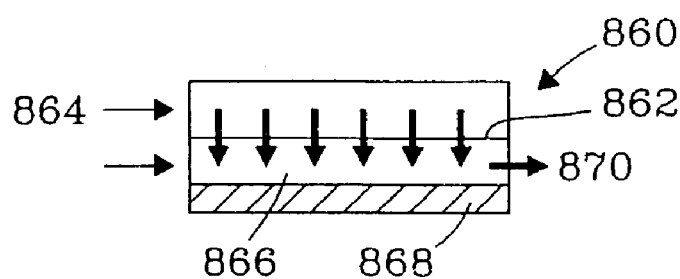
Figure 7A:
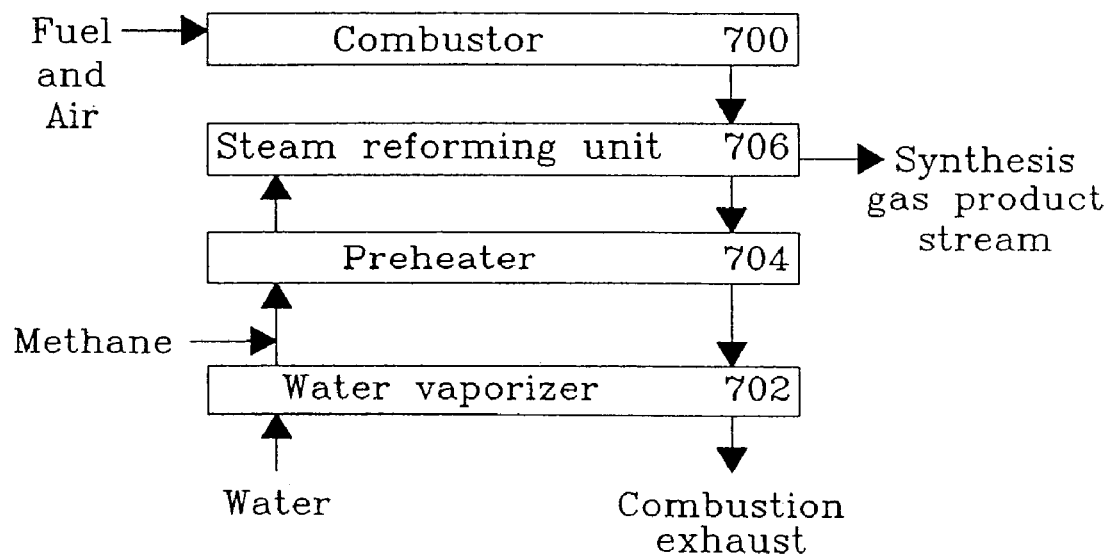
FIG. 7a is a block diagram of a microchannel steam reforming system.
Figure 7B:
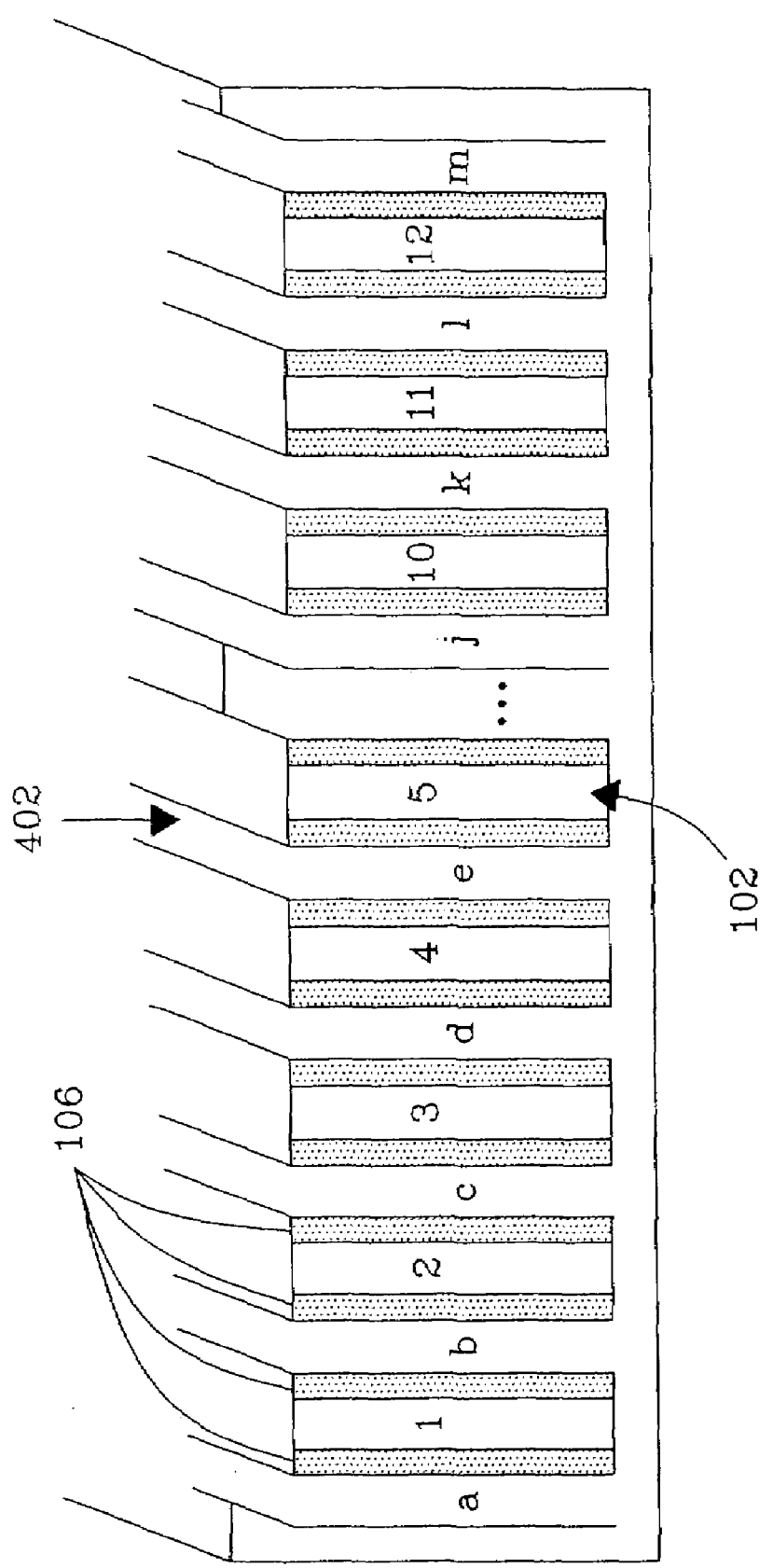
FIG. 7b is an end view of a microchannel reactor.

Various embodiments of the present invention and ways of configuring a catalyst in a reaction chamber are illustrated in FIGS. 1 and 2. The figures illustrate single reaction chambers; however, in preferred embodiments multiple reaction chambers are used in an integrated device when increased capacity is sought, preferably at least 10 reaction chambers, more preferably at least 100 reaction chambers integrated in a chemical reactor. For some low capacity applications, only 1 to 5 channels may be required. Preferably, an integrated chemical reactor contains multiple reaction chambers that are connected in parallel, in series, or both. The reaction chambers are preferably integrated with other components such as microchannel heat exchangers or devices such as illustrated in FIGS. 7a and 7b. The use of the inventive reaction chambers in integrated devices enables much higher rates of productivity in smaller volumes than could be achieved in conventional apparatus.

The term "bulk flow region" refers to open areas within the reaction chamber. A contiguous bulk flow region allows rapid gas flow through the reaction chamber without large pressure drops. In preferred embodiments there is laminar flow in the bulk flow region. Bulk flow regions within each reaction chamber preferably have a cross-sectional area of $5 \times 10^{-8}$ to $1 \times 10^{-2}$ m$^2$, more preferably $5 \times 10^{-7}$ to $1 \times 10^{-4}$ m$^2$. The bulk flow regions preferably comprise at least 5%, more preferably 30-80% of either 1) the internal volume of the reaction chamber, or 2) the cross-section of the reaction chamber.

The reaction chamber has dimensions of height, width and length. The height and/or width is preferably about 2 mm or less, and more preferably 1 mm or less (in which case the reaction chamber falls within the classical definition of a microchannel). The length of the reaction chamber is typically longer. Preferably, the length of the reaction chamber is greater than 1 cm, more preferably in the range of 1 to 20 cm. Typically, the sides of the reaction chamber are defined by reaction chamber walls. These walls are preferably made of a hard material such as a ceramic, an iron based alloy such as steel, or monel. More preferably, the reaction chamber walls are comprised of stainless steel or inconel which is durable and has good thermal conductivity.

In preferred embodiments, the reaction chamber(s) is in thermal contact with a microchannel heat exchanger. This combination of reaction chamber(s) and heat exchanger(s) can result in high rates of thermal transfer. Examples and more detailed description including the use of microchannel heat exchangers are provided in U.S. patent application Ser. No. 09/492,246, filed Jan. 27, 2000, incorporated herein by reference. In preferred embodiments, the apparatus and methods have a heat flux of at least 0.6 W per cubic centimeter.

In place of, or in addition to, a microchannel heat exchanger, thermal transfer can occur between adjacent (or thermally contacting) reaction chambers—preferably reaction chambers could be coupled such that heat from an exothermic reaction in one reaction chamber is transferred to an endothermic reaction in an adjacent reaction chamber.

In some preferred embodiments, the reaction chamber has an inlet and an outlet with a contiguous bulk flow path from the inlet to the outlet. In these preferred embodiments, the pressure drop from inlet to outlet is preferably less than 20%, more preferably less than 10% of system inlet pressure. The pressure drop is preferably less than 350 kPa, and more preferably the pressure drop is less than 70 kPa. A low pressure drop is desired to reduce the size and cost of other system equipment such as pumps and compressors. In other embodiments, the reaction chamber may include a section, such as a porous plug, that interferes with bulk flow.

Equilibrium conversion is defined in the classical manner, where the maximum attainable conversion is a function of the reactor temperature, pressure, and feed composition. For the case of hydrocarbon steam reforming reactions, the equilibrium conversion increases with increasing temperature and decreases with increasing pressure.

The "porous catalyst material" described herein refers to a porous material having a pore volume of 5 to 98%, more preferably 30 to 95% of the total porous material's volume. At least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by Mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions. The porous material can itself be a catalyst, but more preferably the porous material comprises a metal, ceramic or composite support having a layer or layers of a catalyst material or materials deposited thereon. Preferably the support is a foam metal or foam ceramic.

Preferred major active constituents of the catalysts include: elements in the IUPAC Group IIA, IVA, VA, VIA, VIIA, VIIIA, IB, IIB, IVB, Lanthanide series and Actinide series. The catalyst layers, if present, are preferably also porous. The average pore size (volume average) of the catalyst layer(s) is preferably smaller than the average pore size of the support. The average pore sizes in the catalyst layer(s) disposed upon the support preferably ranges from $10^{-9}$ m to $10^{-7}$ m as measured by $N_2$ adsorption with BET method. More preferably, at least 50 volume % of the total pore volume is composed of pores in the size range of $10^{-9}$ m to $10^{-7}$ m in diameter. Diffusion within these small pores in the catalyst layer(s) is typically Knudsen in nature, whereby the molecules collide with the walls of the pores more frequently than with other gas phase molecules.

In preferred embodiments, catalysts are in the form of inserts that can be conveniently inserted and removed from a reaction chamber. Reaction chambers (either of the same type or of different types) can be combined in series with multiple types of catalysts. For example, reactants can be passed through a first reaction chamber containing a first type of catalyst, and the products from this chamber passed into a subsequent reaction chamber (or a subsequent stage of the same reaction chamber) containing a second type of catalyst in which the product (or more correctly termed, the intermediate) is converted to a more desired product. If desired, additional reactant(s) can be added to the subsequent reaction chamber.

Catalytic processes of the present invention include: acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, oxidation, partial oxidation, polymerization, reduction, reformation, reverse water gas shift, sulfonation, telomerization, transesterification, trimerization, and water gas shift.

Another advantage of the present invention is that good yields can be obtained with short contact times. In preferred methods, the contact time is less than 100 milliseconds (ms), more preferably less than 50 ms and still more preferably between 1 and 25 ms. Contact time may be reduced by reducing the diffusion distance between the bulk flow and the porous catalyst while concurrently reducing channel length. At these contact times, in a preferred embodiment of hydrocarbon steam reforming, at least 70%, more preferably at least 90%, of the equilibrium conversion of the hydrocarbon entering the beginning of said at least one reaction chamber is converted to hydrogen, carbon monoxide and/or carbon dioxide. Similar improvements can be obtained in other processes.

FIG. 1a illustrates a reaction chamber 802 having a first compartment 804 having at least one dimension of about 2 mm or less, a porous catalyst material 806 and a second compartment 808. This reaction chamber can be used in several ways. For example, a catalyzed reaction can be carefully controlled by passing one reactant (e.g., methane) 810 into the first compartment, passing a second reactant (e.g., water) 812 into the second compartment and, in this manner, effecting a controlled reaction within the porous catalyst material 806. Flow can be controlled by pressure differentials or by plugging one compartment (e.g. plug 814), and the product(s) formed in the porous material can be directed through outlet 816.

FIG. 1k illustrates apparatus 860 where a flow distribution layer 862 (typically a sheet having random, regular, or spaced pores, slots, holes, or the like) can distribute feed 864 along a length of the reaction chamber 866. The reaction chamber 866 preferably contains a porous catalyst material 868 (although illustrated as a single layer along the length of the reaction chamber—thus enabling low pressure drop, it should be recognized that a porous catalyst material could have any of the configurations described herein). Product 870 exits the reaction chamber. Distributing the feed serves to lower the local partial pressure of one of the reactants. This has advantages for reactions that are parallel or series-parallel in nature, where the local concentration tends to favor one reaction pathway over another. For example, partial oxidation reactions can be improved by this distributed feed approach which increases selectivity to the desired product over the undesired deep oxidation products.

FIG. 1b illustrates an embodiment of the inventive reaction chamber in which a bulk flow path 820 is disposed between porous catalyst material 822, although some flow may convectively travel through the large pores in the porous catalyst material. Flow through the large pores increases when the pore diameter of the porous insert increases and approaches an order of magnitude below the hydraulic diameter of the open area. This reaction chamber could be configured as a tube, with a ring or partial ring of catalyst, but is more preferably a planar arrangement. The planar arrangement enables economical stacking of reaction chambers with other components such as: additional reaction chambers, heat exchangers, etc. The contiguous, straight-through configuration of the bulk flow channel creates the opportunity to perform gas phase catalysis with low pressure drops.

FIGS. 1c and 1d illustrate reaction chamber configurations in which corrugated catalyst inserts 826 provide high surface area for gas phase catalysis while contiguous flow paths 828, 832 enable catalysis to be performed with low pressure drops. The inserts 826 either have a surface coating of a porous catalyst material or, preferably, are comprised of a porous catalyst material. A similar configuration is illustrated in FIG. 2d.

FIG. 1e illustrates an embodiment in which a corrugated porous catalyst material 826 is disposed in the reaction chamber such that gas flow is partially through, and around the catalyst. This configuration ensures contact with the porous catalyst; however, this configuration has the disadvantage of significantly higher pressure drops but the advantage of more intimate contact of the reactants with the active catalyst surface.

FIGS. 1f and 1g utilize catalyst fibers 836, 838. These fibers may, for example, be porous ceramic, metal or composite fibers. The parallel fibers 836 are preferred because they cause less of a pressure drop. The fibers 838 create tortuous flow through the reaction chamber. In either case, catalyst fibers are preferred over powders because they cause less pressure drop, can have better thermal conductivity, and can provide a more uniform and controlled surface for catalysis. The catalyst walls 840, 842 can be ceramic (for high temperature operation), metal (for good thermal conductivity), composites, or porous catalyst (for additional reactivity and/or addition or removal of gas components).

FIGS. 1h and 1i illustrate reaction chambers with baffles 846, 848. Baffles 846 comprise plates or rods composed of a porous catalyst material or that are coated with a porous catalyst material. Baffles 848 comprise plates or rods composed of a porous catalyst material. Flow can either be parallel 849 or nonparallel 847 or differing reactants can flow in differing directions (e.g. orthogonal reactant flows). In either case, there is a contiguous bulk flow through the chamber. These baffles can create turbulence and enhance contact of gaseous reactants with a catalyst. The baffles, which preferably comprise a thermally conductive metal, provide good heat transport to (or from) the reactor walls. The reaction chamber walls 854 may be of the same materials described above for walls 842.

FIG. 1j illustrates a porous catalyst matrix material 850 within which there are contiguous bulk flow channels 852. The matrix 850 can be the reaction chamber walls or the entire article 855 can be an insert that fits into an opening. Preferably the matrix material contains 1 to 10,000 more preferably 10 to 1000 bulk flow channels 852. In a preferred embodiment, the bulk flow channels 852 are essentially straight. In another embodiment, these channels are tortuous. In yet another embodiment, the channels 852 are filled with a catalyst material and bulk flow of reactants and products is primarily through the matrix.

Figure 2A:
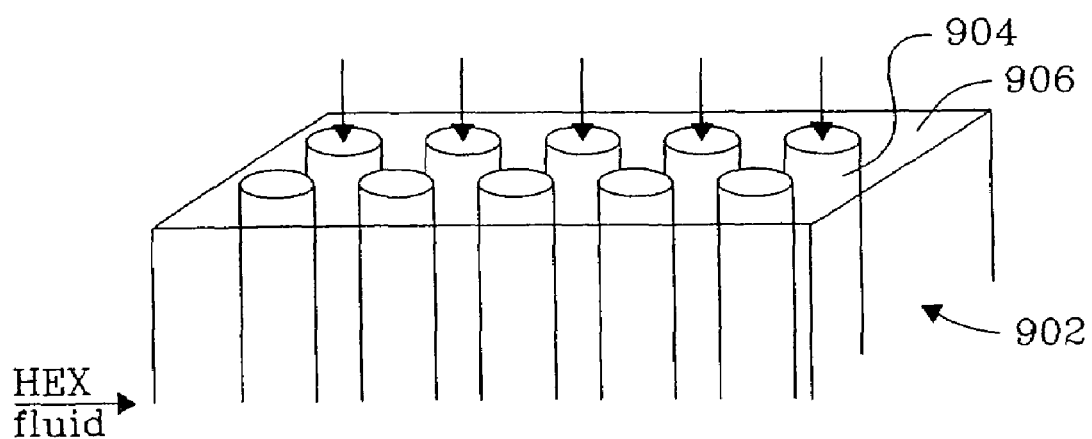
FIG. 2 illustrates schematic views of reaction chamber configurations including (a) a perspective view of catalyst channels with cross flow of a heat exchange fluid; (b) a cross-sectional view of a porous catalyst material that does not directly contact the walls of the reaction chamber; (c) top—a reaction chamber with a porous plug, and bottom —multiple flow channels with a mixing chamber; (d) shaped porous catalyst material; (e) a u-shaped channel filled with porous catalyst material; (f) porous dividers; and (g) mixing reactant streams that are directed to flow between layers of porous catalyst material.

FIG. 2a illustrates a reactor 902 with reaction tubes/chambers 904, each of which may contain a porous catalyst material (not shown) in any of the configurations described herein. On the outside of these tubes is a bulk flow volume 906. In a preferred embodiment, a heat exchange fluid flows through the bulk flow volume; flow of the heat exchange fluid can be cross-flow, concurrent flow or counterflow to the flow of gaseous reactants and products.

Figure 2B:
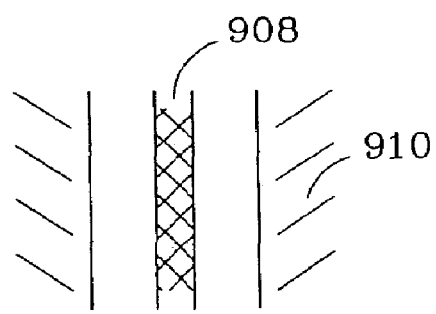

FIG. 2b illustrates a configuration in which a porous catalyst material 908 is disposed within the reaction chamber without direct contact to the reaction chamber walls 910. In another embodiment (not shown), the material 908 comprises a core of a large pore structure (in which molecular diffusion occurs) and a small pore structure (through which Knudsen diffusion occurs) on the outer sides. Catalyst may be coated on the small pore structure, or on the large pore structure, or on both.

Figure 2C:
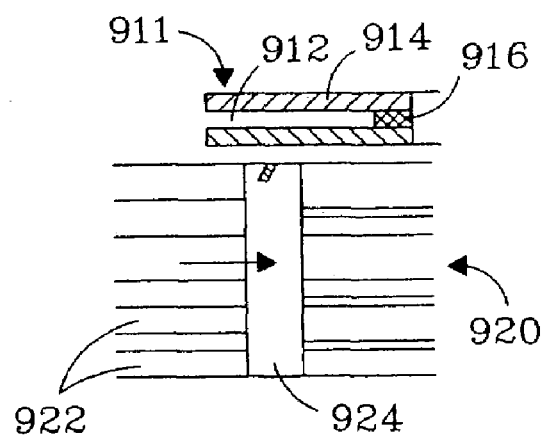
Figures 2D, 2E:
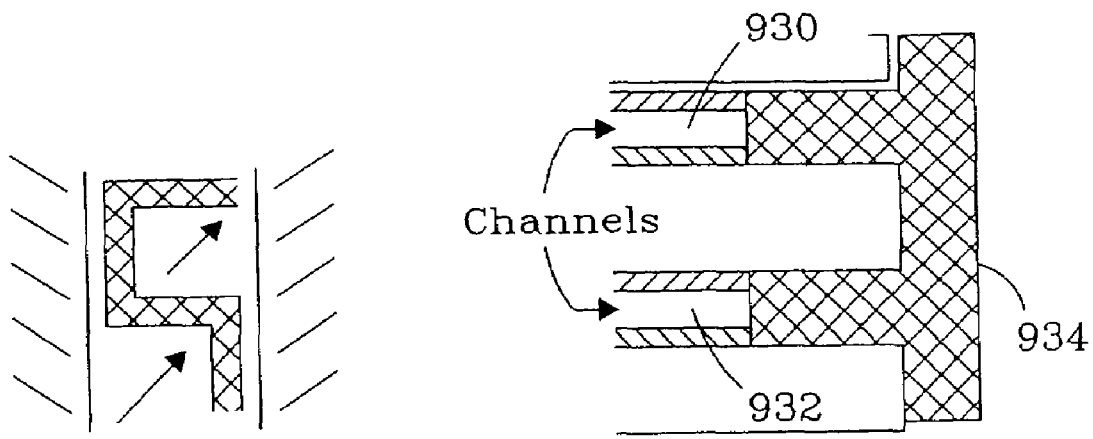

The top of FIG. 2c illustrates a reaction chamber 911 having a bulk flow path 912 and porous catalyst material 914, 916. The porous plug 916 serves to provide catalyst contact to any gaseous reactants that remain unreacted after passage through bulk flow path 912. The flow regime in this example, and in other figures, is typically laminar based upon the classical definition of the Reynolds number less than 2000. Although the flow regime may also be transitional or turbulent in the microchannels, this is less common. For laminar flow, there will be reactants that move along the centerline of the channel. Not all molecules may have an opportunity to diffuse to the porous catalyst and react. For those molecules that do not diffuse to the wall to react, this is referred to as 'slip'. The overall reactor conversion may thus be a few percentage points lower than equilibrium would suggest attainable. The use of the porous catalyst material through the entire cross section for a fraction of the reactor length serves to reduce slip and enable overall conversions with a closer approach to equilibrium.

The bottom of FIG. 2c illustrates a reactor comprised of multi reaction chambers 922 and a mixing chamber 924. The mixing chamber combines gases from at least two reaction chambers 922. The mixing chamber helps to equalize concentration between multiple reaction chambers by mixing the possibly laminar flow streamlines and helps to ensure a higher overall conversion than if the at least two reaction chambers were joined into one chamber by reducing the centerline slip of reactants.

FIG. 2e illustrates a reactor in which the bulk flow from at least two reaction chambers 930, 932 flow into porous material 934. In an alternative mode of operation, flow enters through flow path 930, through porous material 934 and out through flow path 932. This embodiment also serves to reduce the possible slip of reactants and bring the overall reactor conversion closer to that predicted at equilibrium.

Figure 2F:
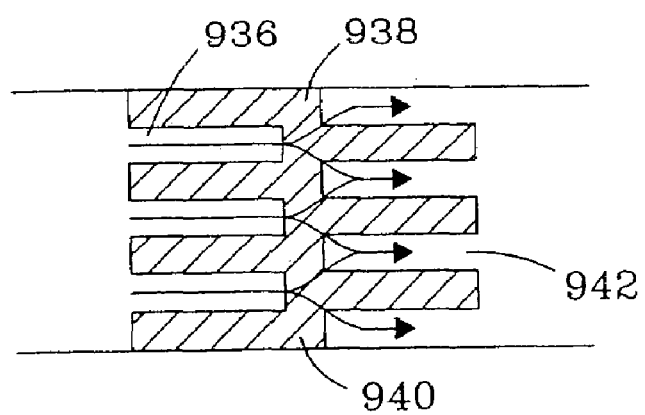

FIG. 2f illustrates a forked configuration in which a gaseous reactant enters a first compartment 936, having a dimension of about 2 mm or less, and convectively travels past porous catalyst material 938 and then travels convectively through porous catalyst material 940. While traveling in compartment 936, the feed may diffuse to the porous catalyst and react. The gas exiting the porous catalyst material 940 flows into second compartments 942. The compartments 936 and 942 may or may not be offset. By offsetting porous dividers 938, the gas flows in adjacent first compartments are further mixed to reduce the slip of reactants.

Figure 2G:
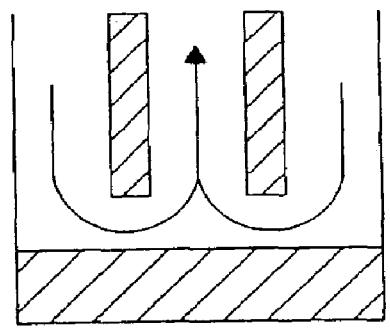

FIG. 2g illustrates a flow configuration where the feed flows along one side of a porous catalyst in the first flow path, makes at least one bend, and then travels back along the other side of the porous catalyst in the opposite flow direction to form at least one second flow path. In an alternate configuration, a second catalyst may be used for the second flow path. In another configuration, a wall may separate the porous catalysts used in the first and second flowpath.

Figure 3A:
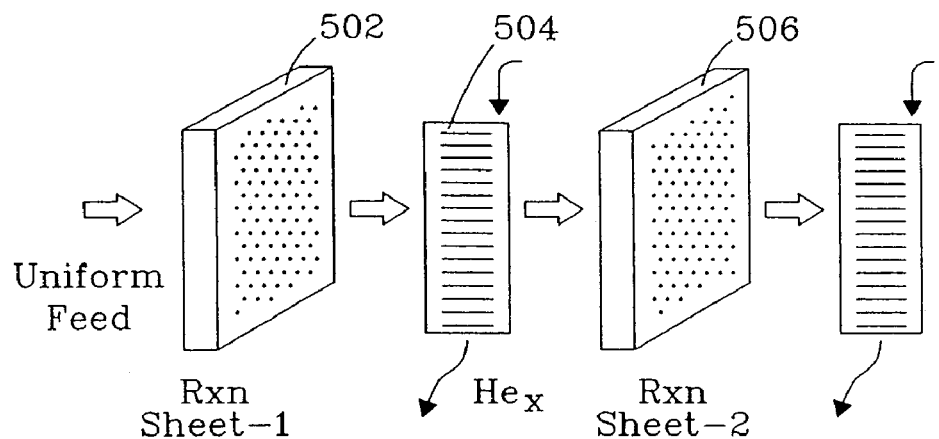
FIG. 3a illustrates layers of a chemical reactor containing multiple sheets of porous catalyst material.
Figure 3B:
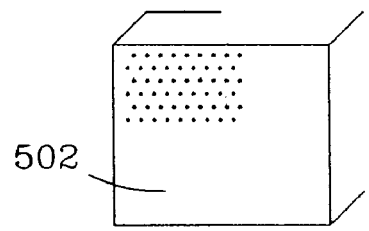
FIG. 3b illustrates a view of a layer of porous catalyst material.
Figure 3C:
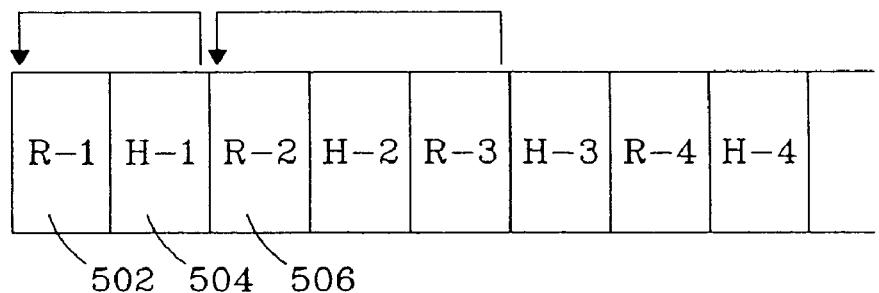
FIG. 3c is a schematic illustration indicating recycled flow in a chemical reactor.

FIGS. 3a-3c illustrates another aspect of the invention in which a heat exchanger 504 is disposed between two layers of porous catalyst sheets 502, 506. The layers may be assembled as sheets or as an integrated device. In a preferred embodiment, a gas exiting the first porous catalyst sheet 502 then passes through at least one array of microchannels in the heat exchanger 504 and travels toward the second porous catalyst sheet 506. A separate heat exchange fluid is preferred in heat exchanger 504 to either remove heat from an exothermic reaction in chamber 502 or to add heat for the case of an endothermic reaction in chamber 502. The flow of heat exchange fluid may be either co-current, countercurrent, or cross current. In an alternate embodiment the heat exchanger 502 could operate in a recuperative heat exchange mode, whereby the cold reactants could be preheated in at least one first array of microchannels in heat exchanger 504, then fed to the reaction chamber in 502 to undergo an exothermic reaction, and then cooled in at least one second array of microchannels in heat exchanger 504 that is exchanging heat with the first array of microchannels in heat exchanger 504. The product mixture from the first reaction chamber 502 that travels through the heat exchange chamber 504 may then travel to at least one second reaction chamber 506 to undergo a different or similar reaction.

This alternating structure can be repeated any number of desired layers. In a preferred embodiment, the layers shown in FIG. 3a can be laminated and walls placed around the laminate to form a reactor. The reactor has appropriate openings, valves, etc. to control input of reactants output of products and flow of heat exchange fluids. The porous catalyst layers can be the same or can be different. For example, products from the first catalyst layer 502 can be subjected to a second reaction (different from the first reaction) possibly with the use of one or more porous catalysts (different from the catalyst on the first layer) at the second sheet 506 to form a different product. The porous catalyst layers must be sufficiently porous to permit the flow of gases through the layers and preferably, these layers are comprised of the porous catalyst material described herein. The porous catalyst layer 502 and preferably other porous catalyst layers (e.g., 506), should have contiguous channels through the layer. The smallest width or height dimension of these channels is 0.1 micrometer to about 2 mm, preferably 0.3 micrometers to 2 mm. A porous catalyst material is disposed in the layers such that gas moving through the layers contacts the porous catalyst material. These channels could also be any of the reaction chambers described herein. The length of channels can be any length including less than 2 mm.

In another aspect, the invention can be defined to include a chemical reactor including one porous catalyst layer 502 and a heat exchanger 504. Optionally, fluid flow through the heat exchanger can be directed into a reaction chamber such as any of the reaction chambers described herein.

The heat exchanger is preferably a microchannel heat exchanger. As illustrated in FIG. 3c, the laminate can be configured such that a portion of flow from any layer can be recycled back upstream to again flow through all or part of the laminate. Recycle may be desired to raise the conversion if thermodynamically attainable. As an alternate configuration, the product may be separated from the unreacted feeds while on the recycle path back to an earlier reaction section.

Figure 3D:
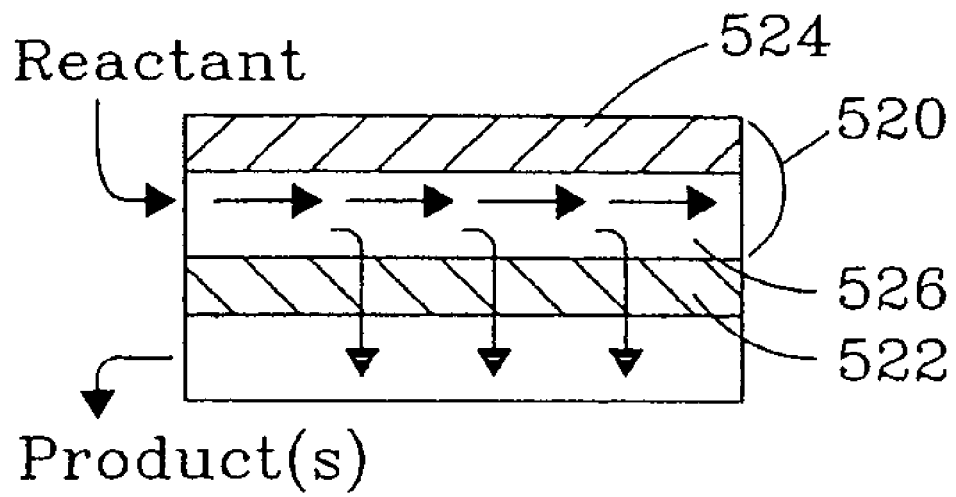
FIG. 3d illustrates a cross-sectional schematic view of a reaction chamber configuration from which products can be removed through a selectively permeable layer.
Figure 3E:
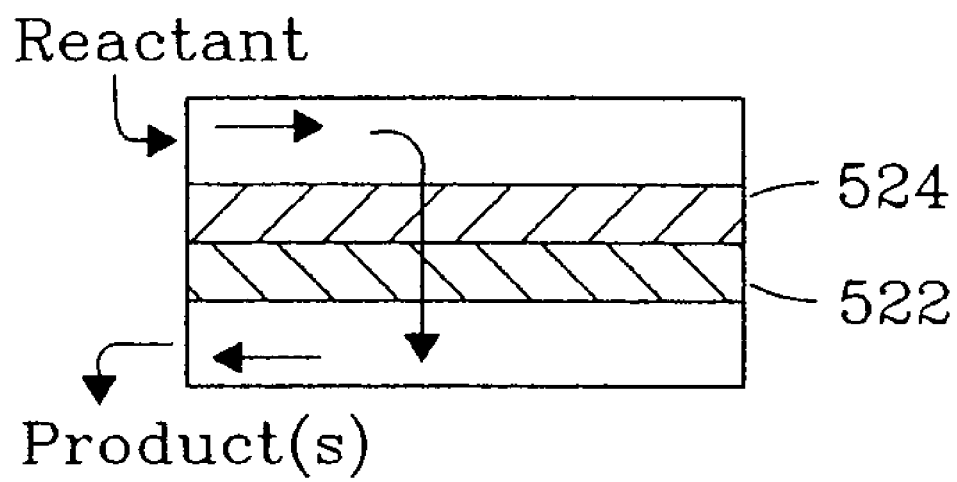
FIG. 3e illustrates a cross-sectional schematic view of a reaction chamber configuration from which products can be removed through a selectively permeable layer.

In FIG. 3d, a product may be separated from the reaction chamber 520 as it is formed through the use of an active separating agent 522 such as a membrane or sorbent. The continuous removal of products can drive otherwise equilibrium-limited reactions to completion. The products diffusing out of the porous catalyst 524 may further diffuse across the open area 526 to the active separating agent on the opposing wall. For example, the separating agent 522 can be a palladium membrane for the selective removal of hydrogen gas. In an alternate embodiment shown in FIG. 3e, the products may diffuse through the porous catalyst to the adjacent wall which is also an active separating agent.

EXAMPLE 1

An experiment was conducted to demonstrate the present invention using 1 microchannel for methane steam reforming. The microchannel was placed within a tube furnace to provide the required endothermic reaction heat. The microchannel was 1.52-cm long and 0.66-cm high. The width (or opening) of the microchannel was 0.0762-cm or 762-microns. The 0.0762-cm width included two porous structures that covered opposite walls and each had a width of 254-microns leaving a bulk flow path between the two porous structures of 254 microns. The porous structure contained a catalyst of 13.8%—Rh/6%—MgO/$Al_2O_3$ on a metal felt of FeCrAl alloy obtained from Technetics, Deland, Fla. 13.8 wt % Rh6 wt % MgO/$Al_2O_3$ powdered catalyst was prepared by 1) calcining a high surface area gamma-alumina at 500° C. for 5 hours; 2) impregnating the gamma alumina with MgO using the incipient wetness method with an aqueous solution of magnesium nitrate; and obtaining an MgO modified gamma alumina support; 3) drying the modified support at 110° C. for 4 hours followed by 4) a second calcination at 900° C. for 2 hours; 5) impregnating the modified support with $Rh_2O_3$ with the incipient wetness method from a rhodium nitrate solution; 6) followed by a final drying at 1101° C. for 4 hours and a 7) final calcinations at 500° C. for 3 hours to obtain a powder of the supported catalyst. The powdered catalyst was ball-milled overnight and slurry dip-coated on the FeCrAl felt until the desired loading is achieved. The coated catalyst was dried at 90° C. overnight and calcined at 350° C. for four hours. Prior to the catalyst evaluation, catalyst was reduced in 10% $H_2/N_2$ (100 cc(STP)/min) at 110° C. for four hours.

The methane inlet flowrate was 50.3-cc/min at standard conditions and the water (liquid) flowrate was 7.3 mL/hr, corresponding to a steam to carbon ratio of approximately 3:1. The methane and water were preheated to near the reaction temperature before entering the microchannel. Gas flow was in the bulk flow path between the porous structures had a Reynold's number less than about 500, and molecular diffusion brought reactants and products to and from each pore surface containing the catalyst.

Results are shown in Table 1-1 of performance as a function of temperature for very short residence times (less than 10-milliseconds).

TABLE 1-1

Performance data in single microchannel

| Temperature | Residence time (milliseconds) | Methane conversion (%) | CO selectivity (%) | Pressure drop (psi) |
| --- | --- | --- | --- | --- |
| 650 | 2.3 | 54.2 | 42.3 | 0.05 |
| 700 | 2.2 | 70.9 | 50.9 | 0.13 |
| 800 | 2.0 | 88.9 | 65.4 | 0.45 |
| 900 | 1.8 | 89.6 | 74.6 | 1.00 |

EXAMPLE 2

An experiment was conducted utilizing apparatus illustrated in FIG. 7a including a fuel combustor 700, water vaporizer 702, a reactant preheat heat exchanger 704, and a steam-reforming unit 706. The steam reforming unit 706 was constructed with 12 parallel channels (FIG. 7b) 1, 2, 3 . . . 12 each of length 2.79 cm, height 2.54 cm, and width of 750 microns. The porous structure 106 was felt FeCrAl alloy with a porosity ranging from 35% to 90% obtained from Technetics, Orlando, Fla., having a width of about 250 micron. Pieces of metal felt with length and height nearly equal to the channel length and height were coated with the catalyst using the same slurry dipping method and powder catalyst as described in Example 1. These felts were affixed to the walls on opposite sides of the channels leaving a bulk flow path of about 250 microns in each channel. The reactor microchannels were interspersed with heat exchange channels a, b, c . . . m to provide the endothermic reaction heat. The adjacent (and interleaved) parallel heat exchange microchannels (13 total) were hermetically sealed with respect to the reaction microchannels to prevent reactant by-pass around the catalyst material. The heat exchange microchannels had nearly the same height and length as the reaction microchannels. The width of each heat exchange channel was 508-microns. The heat exchange fluid 402 within the steam-reforming unit was the combustion product of hydrogen (20 SLPM feed) and excess air (168 SLPM feed). The combustion product 402 was fed in a cross-flow configuration to the direction of reactant flow 102.

Reactants were methane and water in the form of steam at flow rates of 1 SLPM and 2.81-SLPM (or 2.26-ml/min liquid) respectively. Gas hourly space velocity was approximately 100,000 hr⁻ corresponding to a residence time of 9.2 milliseconds. Reactor inlet temperature was 736° C. receiving a mixture of methane and steam. The pressure drop through the microchannel steam-reforming unit was less than 0.6 psi.

Product conversion of methane was 79% and selectivity to CO was 65%.

EXAMPLE 3

Steam reforming experiments were conducted to evaluate the effectiveness of various catalyst configurations within a reaction chamber. Engineered catalysts with various structures were synthesized and activated using the same procedures—as described in Example 1. The felt and ruffle substrates are porous materials formed from FeCrAl alloy fibers, and were purchased from Technetics, Deland, Fla.

Catalyst was inserted within the single channel device with a snug fit. All catalysts were evaluated in a single channel device. The single channel device is placed in a tube furnace. Reactants were preheated in the top zone of the furnace, and were introduced into the single channel device in a down-flow mode. Steam reforming of methane was conducted at a fixed contact time, a steam-to-carbon ratio of 2/1, and a temperature maintained at 850° C. (chamber temperature was continuously monitored by a thermocouple). Effluent flowrate was measured by a bubble flowmeter, and product was analyzed using gas chromatography. The catalyst configurations tested and direction of flow is illustrated on the bottom of FIG. 4. Pressure ranged from 0 to 350 psig. For all experiments described in Example 3, the measured pressure drop across the engineered catalyst was less than 0.2 psig. Contact time is defined as the total feed gas volume at standard temperature and pressure divided by the catalyst chamber volume.

Single felt (0.01"×0.35"×2"/0.025 cm×0.88 cm×5.0 cm) supported catalyst was tested in a single channel device (0.03"×0.35"×2"/0.075 cm×0.88 cm×5.0 cm). The felt was placed in the middle of the single channel device to simulate a flow-by concept where the catalyst is not in contact with the channel walls. In this case, the catalyst chamber volume is confined as the single channel volume (0.03"×0.35"×2"/ 0.075 cm×0.88 cm×5.0 cm).

Each of the felt catalysts in the double felt configuration have the identical dimensions as that of the single felt (0.01"×0.35"×2"), and were evaluated in a single channel device (0.03"×0.35"×2"/0.075 cm×0.88 cm×5.0 cm). Two felts with a gap of 0.01" were placed in the single channel device so that both felts were in close contact with the walls. Again, the catalyst chamber volume is defined as the single channel volume.

Figure 4:
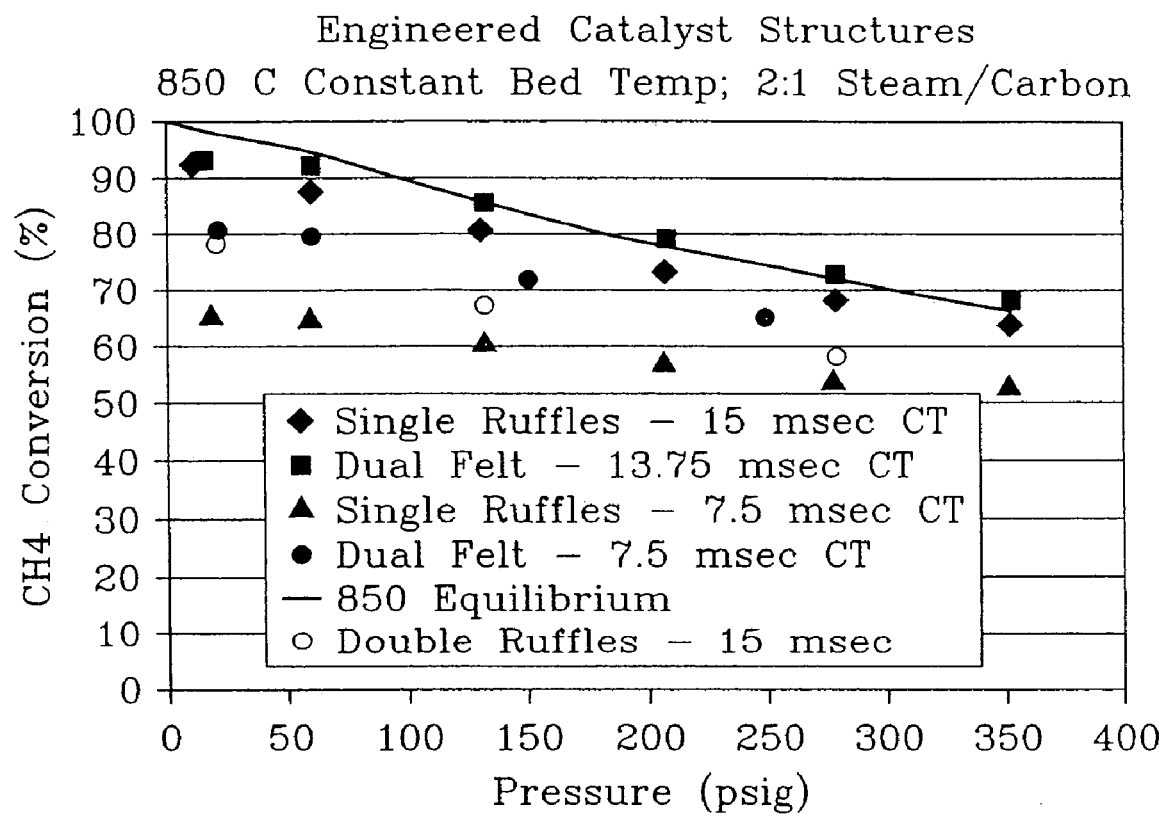
FIG. 4 shows results of methane steam reforming testing of various reaction chamber configurations.
Figure 4:
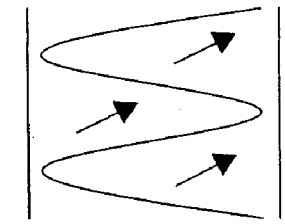
Figure 4:
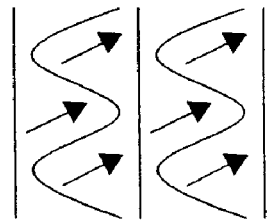
Figure 4:
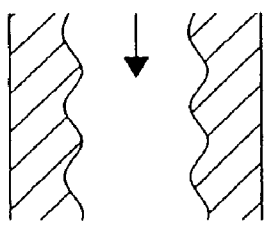
Figure 4:
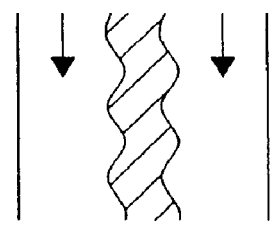
Figure 5:
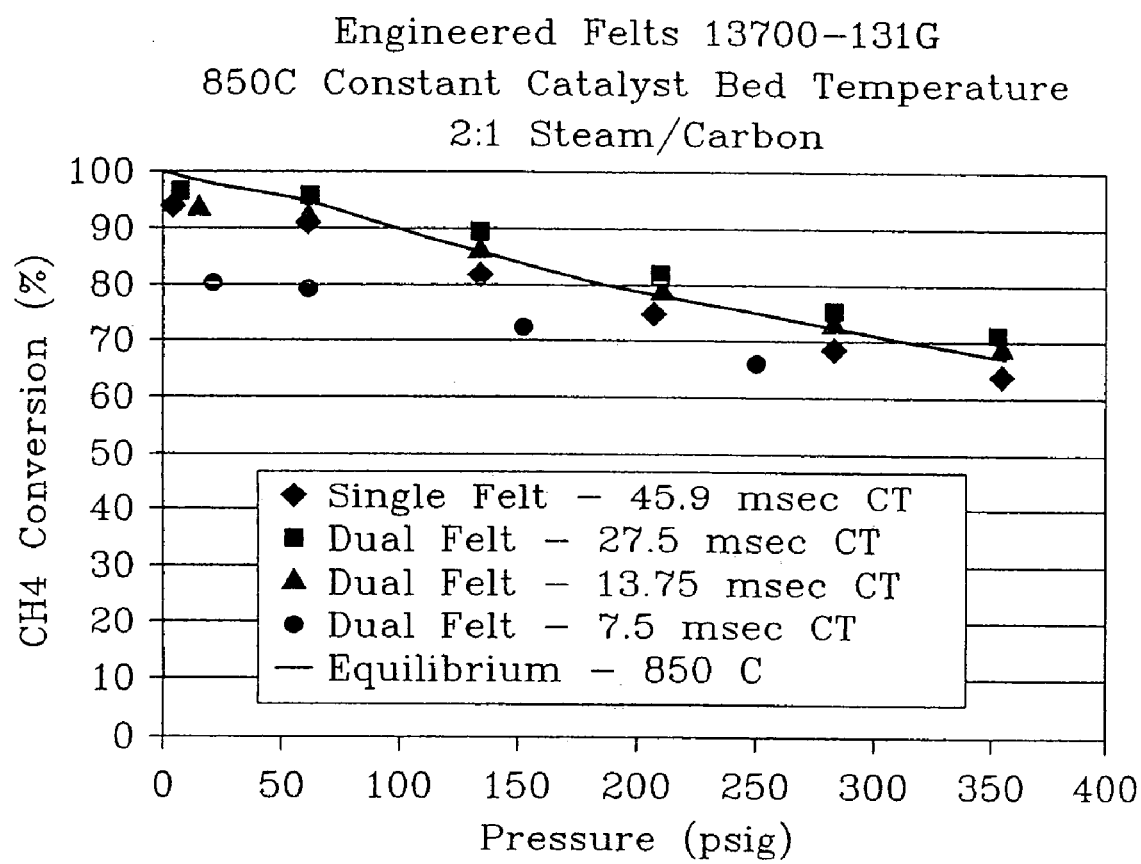
FIG. 5 shows results of methane steam reforming testing of various reaction chamber configurations.
Figure 6:
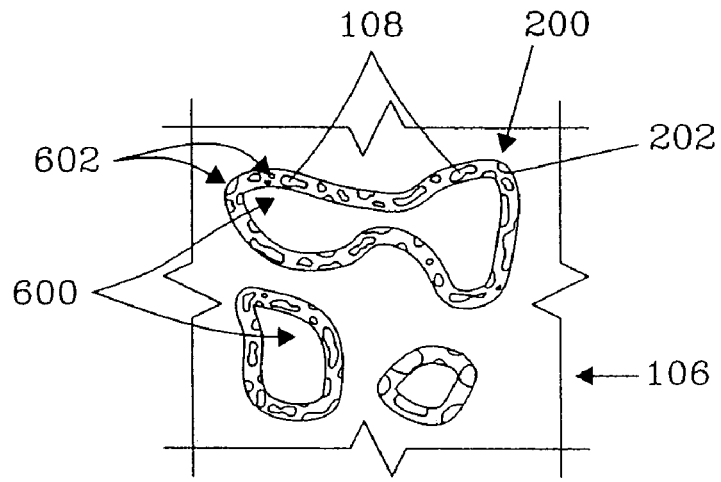
FIG. 6 is a cross section of the porous material with a second porous material on porous surface area.

Felt with a thickness of 0.01" (0.025 cm) was crimped into a corrugated form, and is called a ruffle. Ruffles studied in this work have a fixed wave length of 0.117" (0.295 cm) and a fixed amplitude of 0.05" (0.127 cm). The dimensions of ruffle are 0.35" (0.88 cm) in width and 2" (8.0 cm) length. Reactants flow in the direction perpendicular to the waves. Single ruffle was snug-fitted into a single channel device (0.05"×0.35"×2"), which confines the catalyst chamber volume. Double ruffle configuration is designed by stacking two identical ruffles with a shim (0.01"×0.35"×2"/0.025 cm×0.88 cm×5.0 cm) in between. Double ruffle was evaluated in a wider single channel device (0.11"×0.35"×2"/0.28 cm×0.88 cm×5.0 cm), which confines the catalyst chamber volume. Experimental data are shown in FIGS. 4-5. For this data the experimental error was about 5%. For comparison purposes, equilibrium conversions are also included in these figures under the conditions studied. Over the pressure range investigated, all four catalyst structures exhibit fairly high activities as indicated by high conversions (>50%) at short contact times (<50 ms).

The best results were obtained using the dual felt configuration. In this configuration, there was no significant difference between a contact time of 28 msec and 14 msec, while a contact time of 7 msec demonstrated a less effective conversion. Overall, activity of engineered catalyst structures decreases in the following order: double felts>single ruffle>double ruffles>single felt. It is noteworthy that the catalyst site density per volume also follows the same trend as the activity. In addition to catalyst site density, heat transfer characteristics are not same with various structures, and heat transfer efficiency is estimated to decrease in the same order as that of activity.

Under the fixed temperature, pressure, and feed stoichiometry, the information containing methane conversions and contact time can be used to rank the activity of various engineered structures. In general, longer contact time results in higher conversions. FIG. 5 compares the activity between single felt and double felts. Under the identical conditions except the contact time, activity of single felt is still lower than that of double felts even though the contact time is three time longer (45.9 ms vs 13.75 ms). FIG. 4 compares the activity between single ruffle and double-ruffles. Under the identical conditions (15 ms contact), single ruffle shows 10% higher conversions than double-ruffles. FIG. 4 shows that at an identical contact time (7.5 ms), dual felts out-perform single ruffle by at least 10%. Since dual felts showed three times higher activity than single felt, while dual felts only showed slightly higher than 10% activity over single ruffle, and single ruffle only showed slightly higher than 10% activity over double ruffles, it can be readily concluded that double ruffle is more active than single felt.

CLOSURE

While preferred embodiments of the present invention have been shown and described, it will be apparent to those skilled in the art that many changes and modifications may be made without departing from the invention in its broader aspects. The appended claims are therefore intended to include all such changes and modifications as fall within the true spirit and scope of the invention.

We claim:

1. A chemical reactor comprising:
   at least one reaction chamber comprising at least one porous catalyst material and at least one open area wherein each of said at least one reaction chamber has an internal volume defined by reaction chamber walls;
   wherein said internal volume has dimensions of chamber height, chamber width and chamber length;
   wherein said at least one reaction chamber comprises a chamber height or chamber width that is about 2 mm or less;
   wherein, at a point wherein said chamber height or chamber width is about 2 mm or less, said chamber height and said chamber width define a cross-sectional area;
   said cross-sectional area comprising a porous catalyst material and an open area, wherein said porous catalyst material occupies 5% to 95% of the cross-sectional area and wherein said open area occupies 5% to 95% of the cross-sectional area;
   wherein said open area in said cross-sectional area occupies a contiguous area of $5 \times 10^{-8}$ to $1 \times 10^{-2}$ m² and wherein said porous catalyst material has a pore volume of 5 to 98% and more than 20% of the pore volume comprises pores having sizes of from 0.1 to 300 microns.

2. The reactor of claim comprising a bulk flow channel that is contiguous over the length of the reaction chamber.

3. The reactor of claim 2 wherein the bulk flow channel is essentially straight.

4. The reactor of claim 2 comprising 5 to 1000 bulk flow channels.

5. The reactor of claim 1 wherein said porous catalyst material comprises a core of a relatively large pore first material and a coating of a relatively small pore second material disposed over at least a portion of said first material.

6. The reactor of claim comprising at least 5 reaction chambers.

7. The reactor of claim 1 comprising multiple reaction chambers and at least one mixing chamber disposed such that gases from at least two reaction chambers can mix in the at least one mixing chamber.

8. The reactor of claim 2 comprising offsetting porous dividers.

9. The reactor of claim 2 further comprising a microchannel heat exchanger in thermal contact with said reaction chamber.

10. The reactor of claim 2 wherein said porous catalyst material is a discrete unit that can be inserted into or removed from the reaction chamber.

11. The reactor of claim 2 further comprising a gas compartment and a flow distribution layer wherein the flow distribution layer is disposed between the gas compartment and the reaction chamber such that gas can flow from the gas compartment through the flow distribution layer to the reaction chamber.

12. The reactor of claim 2 further comprising a gas compartment; wherein a porous catalyst material is disposed between said gas compartment and an open area of said reaction chamber.

13. A chemical reactor comprising:
at least one reaction chamber comprising catalyst rods, plates or baffles having a length to thickness ratio of at least 10, and wherein each of said at least one reaction chamber has an internal volume defined by reaction chamber walls;
wherein said internal volume has dimensions of chamber height, chamber width and chamber length;
wherein said at least one reaction chamber comprises a chamber height or chamber width that is about 2 mm or less; and
wherein said catalyst rods, plates or baffles are disposed in said reaction chamber such that the pressure drop across the reaction chamber is less than 20% of the total system inlet pressure.

14. The reactor of claim 13 wherein said at least one reaction chamber comprises fibers or baffles and said fibers or baffles comprise a porous catalyst material.

15. The chemical reactor of claim 14 wherein said porous catalyst material has a pore volume of 5 to 98% and more than 50% of the pore volume comprises pores having sizes of from 0.1 to 300 microns.

16. The chemical reactor of claim 15 said at least one reaction chamber comprises baffles and wherein said baffles comprise a thermally conductive metal.

17. The chemical reactor of claim 15 said at least one reaction chamber comprises fibers and wherein said porous catalyst material has a pore volume of 5 to 98% and more than 50% of the pore volume comprises pores having sizes of from 0.1 to 300 microns.

18. A chemical reactor comprising:
at least one reaction chamber comprising at least three layers:
a first layer comprising a first porous catalyst material;
a second layer comprising a heat exchanger and at least one fluid flow path through said second layer, said second layer disposed in the reaction chamber such that fluid passing through the first layer can pass through said at least one fluid flow path, and
a third layer comprising a second porous catalyst material said third layer disposed in the reaction chamber such that fluid passing through the second layer can pass into said second porous catalyst material;
wherein said first layer has contiguous channels having dimensions of channel height, channel width and channel length;
wherein said at least one of said contiguous channel comprises a channel height or channel width that is 0.1 micrometers to about 2 mm;
wherein at least part of said at least one of said contiguous channels comprises said first porous catalyst material; and
wherein said first porous catalyst material has a pore volume of 5 to 98% and more than 20% of the pore volume comprises pores having sizes of from 0.1 to 300 microns.

19. The reactor of claim 18 wherein said heat exchanger comprises a microchannel heat exchanger.

20. The reactor of claim 19 wherein said at least one of said contiguous channels comprises a channel height or channel width that is 0.3 micrometers to 2 mm; and wherein said third layer layer has contiguous channels having dimensions of channel height, channel width and channel length, wherein at least one of these contiguous channels comprises a channel height or channel width that is 0.3 micrometers to 2 mm.

21. The reactor of claim 20 wherein said at least one fluid flow path comprises a microchannel.

22. The reactor of claim 19 wherein said first layer has an inlet and said third layer has an outlet and further comprising a conduit connecting said outlet to said inlet.

23. The reactor of claim 22 wherein said conduit contains a separating agent.

24. The reactor of claim 20 wherein the porous catalyst material in said first layer comprises a metal foam or felt.

25. The reactor of claim 19 wherein said at least one fluid flow path through said second layer comprises a reactant stream; and wherein said microchannel heat exchanger comprises a heat exchange fluid; wherein said heat exchange fluid is flowing cross current relative to said reactant stream.

26. The chemical reactor of claim 1 wherein more than 50% of the pore volume comprises pores having sizes of from 0.3 to 200 microns.

* * * * *